United States Patent Office 2,766,304
Patented Oct. 9, 1956

2,766,304
PROCESS FOR PREPARING AZULENES

Karl Ziegler and Klaus Hafner, Mulheim an der Ruhr, Germany

No Drawing. Application September 29, 1955, Serial No. 537,574

Claims priority, application Germany August 7, 1953

10 Claims. (Cl. 260—666)

This application is a continuation in part application of copending application Serial No. 447,918, filed August 4, 1954, now abandoned, for a process for the preparation of azulenes.

The invention of the present application relates to a process for preparing azulenes.

The known processes for the preparation of the hydrocarbon known as "azulene" of the following formula:

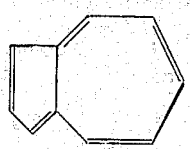

and its substitution products proceed by way of intermediate products, which contain the characteristic bicyclic ring system of azulene, namely a five-membered ring condensed with a seven-membered ring, but still not the full number of five double bonds. For the transformation of these partially hydrogenated intermediate products into the azulenes themselves, dehydrogenation is carried out on conclusion of the hitherto known syntheses, for example by heating with palladium to a high temperature or in some other manner. The yields in such cases are uniformly unsatisfactory, and frequently even decidedly poor. The final yields of azulenes, calculated on the initial substances required for the synthesis of the first initial stages, perhaps amount to a few percent and frequently only fractions of one percent.

The present invention provides a process which renders it possible to prepare azulenes directly, without dehydrogenation being necessary. The yields are much better than with the prior known methods; for example a yield of 60% and more was produced in the decisive final phase of the synthesis of azulene ($C_{10}H_8$) according to the present invention.

It has been found that the compounds of the following general Formula I

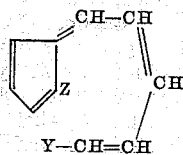

wherein Z stands for hydrogen, Y stands for a member of the group consisting of the halogens, the hydroxygroup, the alkoxy-groups and the substituted and unsubstituted amino-groups and the hydrogen atoms otherwise present in the molecule may be substituted by monovalent radicals, have the tendency to form the azulene ring with elimination of the compound H—Y, and that the formation of the azulene ring may be so strongly accelerated by heating the aforementioned initial products to elevated temperatures and/or by using catalytic media that the preparation of the azulenes becomes possible on a technical scale. It is in general advisable to heat the starting materials to temperatures of about 100–300° C. the preferred range of temperatures being 150–300° C. As catalytic media there may be used small amounts of alkali, acids, metals in the form of powders or salts but preferably high boiling solvents or diluents of basic character such as benzidine or 4,4'-diamino-diphenyl-methane. Any solvent or diluent used in the process according to the invention must not interfere with the ring closing reaction and be inert with regard to the reacting substances. The starting materials may be heated as such i. e. in the absence of solvents or diluents or the heating may be carried out in the presence of solvents or diluents.

The hydrogen atoms otherwise present, that is to say except the hydrogen atom designated by Z and standing in one of the ortho-positions to the side-chain in the molecule of the initial substances, may be replaced by any desired monovalent substituents, but the substituents must be so selected that they do not disturb the ring-closing reaction. It may be preferred in this case to use monovalent neutral substituents, such as alkyl, aralkyl or aryl radicals, especially as it is possible with these substituents for final products having pharmaceutically valuable properties to be obtained in a manner known per se. Benzocyclopentadienes, i. e. indenes and other ring systems of this type, may serve as substituted cyclopentadienes for the purposes of the invention.

The initial substances of Formula I may be present in many cases in a tautomeric form. For example, if Y in Formula I stands for the hydroxy group, this compound may also be present in the following tautomeric form II:

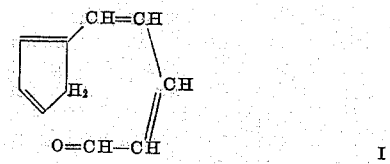

The same possibility of tautomerism exists if Y in Formult I stands for an amino group or a mono-substituted amino group. The tautomeric forms contain in these cases the grouping —CH=NH or —CH=NR. These tautomeric forms may be employed in the process according to the invention in the same manner as the compounds of Formula I.

The products of the tautomeric form II form acetals very readily. These acetals may likewise be introduced as initial substances for the process of the invention. The reaction when using acetals as initial products probably proceeds in that initially 1 mol of alcohol is split off and the corresponding vinyl ether is formed. The latter is then once again a product in the sense of the general Formula I. In this case the process proceeds according to the following equation:

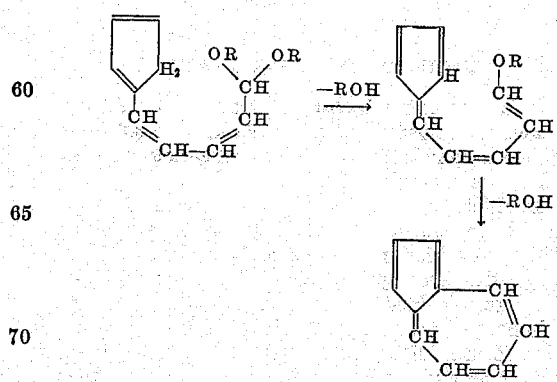

The acetals are therefore to be considered as equivalents of the products of the general Formula I for the purposes of the present invention.

As mentioned before the closing of the ring is greatly accelerated by heating the starting materials to an elevated temperature between about 100 and about 300° C. The closing of the ring is shown by the blue colour which appears when the fulvene serving as the intermediate product is heated. A good result is obtained by heating the starting materials in vacuo or by distillation with superheated steam. It is also possible to use a relatively high temperature and catalytically acting media in combination.

The yield of azulenes is frequently improved if the operation is carried out in the presence of high boiling inert solvents or diluents. The closing of the ring appears to be facilitated thereby. For example, instead of the initial substances being heated as such, these substances may be boiled in a high-boiling solvent and the azulenes which are formed may be drawn off either with the vapours of the solvents themselves or by means of vapours of other solvents which are passed through the reaction mixture or also by a stream of gas. In these cases, the azulene can be isolated from the distillate and separated from possible accompanying substances by known processes for example by shaking with acids or by way of the trinitrobenzolates.

Since the azulenes which are formed by the reaction are sensitive substances, that are capable of undergoing undesirable side reactions when subjected for instance for a longer time to higher temperatures, it is expedient that the azulenes should be subjected for only the shortest possible time to the reaction conditions serving to effect the ring-closing reaction. It is therefore advisable to remove the azulenes from the reaction mixture as soon as they have formed. A short stay of the azulenes in the reaction chamber may be achieved by carrying out the ring-closing reaction and the removal of the formed azulenes from the reaction chamber as a continuous process. The combination of a short stay of the azulenes in the reaction chamber and the working in the presence of solvents or diluents has proved particularly expedient. This embodiment is illustrated in some of the examples given further below.

The initial substances of the aforementioned Formula I may be obtained by condensing a cyclopentadiene, substituted if desired as mentioned above, with a compound of the following formula:

$$O=CH-CH=CH-CH=CH-Y \qquad III$$

wherein Y has the same significance as in Formula I, to form the corresponding fulvene. The formation of the fulvenes may be effected in conventional manner by means of alcoholic alkali or alkali alcoholates. It may also be advisable to condense metal compounds (for example Na, K, Mg or Ca substitution products) of cyclopentadienes with a substance of the Formula III.

Initial products which are available in a particularly convenient manner and which are exceptionally suitable are the compounds of the following Formula IV:

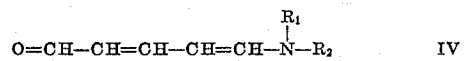

$$O=CH-CH=CH-CH=CH-\underset{\underset{R_2}{|}}{N}-R_1 \qquad IV$$

wherein $R_1$ represents hydrogen or an alkyl radical and $R_2$ represents a phenyl radical which may be substituted.

These compounds can be prepared in various ways from pyridine, for example according to Th. Zincke and W. Würker (Liebigs Annalen, vol. 338, 127 (1905)), from the addition product of dinitrochlorobenzene and pyridine by treatment with for example methylaniline and subsequent partial hydrolysis. The 5-N-methyl-anilido-pentadienal thus obtained is combined very easily and almost quantitatively with cyclopentadiene in the presence of alkali to form a fulvene of deep red colour, and the latter gives azulene and methyl aniline very smoothly when it is distilled, advantageously in vacuo, or also when superheated steam is passed over it.

In a similar manner, isopropyl-cyclopentadiene gives an oily product of a deep blue colour, which may easily be purified in known manner by way of the molecular compound with trinitrobenzene. The light absorption of the isopropyl azulene, which inter alia shows strong maxima at 608, 665 and 738 $\mu\mu$ proves that substantially or exclusively 1-isopropyl azulene is present.

Instead of the compounds of Formula IV, the compounds which can be derived from glutacon dialdehyde by substitution may also be used for the process according to the invention. Thus, the azulene syntheses are also successful with monoanilides of glutacon dialdehyde, for example the p-chloroanilide of the formula

$$O:CH-CH=CH.CH=CH.NH-C_6H_4Cl$$

described by Th. Zincke and Schreyer, Liebigs Annalen, vol. 353, page 384 (1907). Moreover, the Th. Zincke cleavage reaction with dinitrochlorobenzene may also be applied without particular difficulties to β-picoline, derivatives of methyl glutacon dialdehyde being formed which then, after the condensation with cyclopentadiene or its homologues, give azulenes which also contain methyl in the seven-membered ring. It is obvious that instead of the Th. Zincke dinitrochlorobenzene reaction for the preparation of the analogous derivatives of glutaconic aldehyde, it is also possible to use other similar cleavage reactions of pyridine, for example the cleavage of cyanogen bromide according to W. König, J. pr. Chem. (2), 69, 105 (1904), or that with chlorosulphonic acid esters according to P. Baumgarten, Ber. 1924, II, 1622.

As already mentioned, it is also possible for benzocyclopentadiene, i. e. indene, to be used instead of cyclopentadiene. The benzofulvene produced from indene and 5-N-methylanilido-pentadienal, upon being heated under high vacuum, very readily gives the 1.2-benzazulene with the properties described by Plattner, Fürst, Chopin and Winteler (Helvetica Chimica, Acta, vol. 31, 501 (1948).

*Example 1*

18.7 g. (⅒ mol) of 1-N-methylanilido-pentadiene-1.3-al-5, prepared according to Th. Zincke, Liebigs Annalen der Chemie, vol. 333, page 296 (1904) and Th. Zincke and W. Würker, Liebigs Annalen der Chemie, vol. 338, pages 121–127 (1905), are dissolved by heating in 50 cc. abs. ethanol and poured together with 6.6 g. (⅒ mol) of cyclopentadiene into a solution of 2.3 g. of sodium in 30 cc. of abs. ethanol. The mixture becomes very hot and is cooled with ice. The reaction solution assumes a dark red colour. The crystal magma separating out on cooling is filtered off with suction, well washed with strongly diluted acetic acid and, after drying, recrystallized from cyclehexane or ethyl alcohol. 23 g. (98% of the theoretical yield) of 5-(N-methylanilido)-pentadienylidene-cyclopentadiene in the form of crystals of deep red colour are obtained, having a melting point of 111 to 112° C. 1 g. of this fulvene is heated under high vacuum to 150–200° C. Methyl aniline and azulene distil into a receiver cooled to −80° C. After about five hours, the precipitate is taken up in ether and the blue-green ethereal solution is washed several times with N/10 hydrochloric acid. The azulene solution, which is washed neutral and which is now pure blue, is dried and the ether is distilled off in a small column. 340 mg. (=63% of the theoretical yield) of crystallized azulene with a melting point of 96 to 98° C. remain as residue. The melting point of the trinitrobenzolate is 165 to 166° C. The fulvene may also be split up into azulene and methyl aniline by passing over it steam superheated to about 300° C. The azulene then floats in the distillate in blue flakes and is isolated therefrom with ether and then freed from methyl aniline by hydrochloric acid, as described above. The yield of pure azulene corresponds to the yield of azulene obtained by decomposition under high vacuum.

Example 2

A solution of 10.8 g. (1/10 mol) of isopropyl cyclopentadiene (prepared from dimethyl fulvene with lithium aluminium hydride), 18.7 g. (1/10 mol) of 1-(N-methyl-anilido)-pentadiene-1.3-al-5 in 50 cc. of abs. ethyl alcohol is poured into a solution of 2.3 g. of sodium (1/10 mol) in 30 cc. of abs. ethanol and the solution, which assumes a dark red colour, is very briefly heated. After about one hour, the solution is introduced into strongly diluted acetic acid and the oil separating out on the surface is absorbed in ether. The ethereal solution is washed until neutral, dried and then the ether is distilled off. As residue, there remains a dark red viscous oil, which solidifies in crystalline form upon trituration with cyclohexane. The 5 - N-methylanilido-pentadienylidene-isopropylcyclopentadiene recrystallised from cyclohexane melts at 98° C.

1 g. of the dark red oil is heated under high vacuum to 180–190° C. Isopropyl azulene and methyl aniline are then distilled into a strongly-cooled trap (acetone and carbon dioxide). After about five to eight hours, no further isopropyl azulene distils over. The precipitate is absorbed in ether, washed several times with N/10 HCl and dried over calcium chloride after it has been washed neutral. The ether is then distilled off. A blue viscous oil is left, the trinitrobenzolate of which has a melting point of 112 to 113° C. Yield of isopropyl azulene: 350 mg.=56% of the theoretical yield.

Example 3

18.7 g. (1/10 mol) of 1-N-methyl-anilido-pentadiene-1.3-al-5 are dissolved by heating in 50 cc. of absolute ethanol and poured together with 8 g. (1/10 mol) of methyl cyclopentadiene into a solution of 2.3 g. of sodium in 30 cc. of absolute ethanol. The solution instantly assumes a dark red colour. It is gently heated and then left to stand for 5 hours at room temperature. The reaction mixture is then introduced into strongly diluted acetic acid and 5 - N-methyl-anilido-pentadienylidene-methylcyclopentadiene separating out on the surface as an oil is absorbed in ether. The ethereal solution is dried and a viscous oily residue remains after filtering off the ether with suction. 1 g. of this residue is heated under high vacuum to 200° C. N-methyl aniline and methyl azulene are distilled into a preliminary deep-cooled receiver. After completing the distillation the precipitate is taken up in ether, the N-methyl aniline is removed by N/10 hydrochloric acid from the ethereal solution, the latter is washed until neutral and the now pure blue ethereal methyl azulene solution is dried. After distilling off the ether in a small column, 400 mg. (=67% of the theoretical yield) of methyl azulene are left behind as a blue oil. The well crystallized trinitrobenzolate melts at 157–159° C. The light absorption of the methyl azulene shows inter alia strong maxima at 608, 670 and 740 μμ and is evidence, as is also the melting point of the trinitrobenzolate, that substantially or exclusively 1-methyl azulene is present.

Example 4

A solution of 11.6 g. (1/10 mol) of freshly distilled indene and 18.7 g. (1/10 mol) of 5-N-methyl-anilido-pentadienal in 30 cc. of absolute ethyl alcohol is added to a solution of 2.3 g. of sodium in 30 cc. of absolute ethyl alcohol. The mixture instantly assumes a deep red colour. After brief heating the mixture is allowed to stand for twenty-four hours at room temperature, and then the reaction mixture is poured into strongly diluted acetic acid and the dark red oily layer of 1-N-methyl-anilido-pentadienylidene-indene is taken up in ether. After drying the ethereal solution and distilling off the ether, a viscous oil which is deep red in colour is left. A portion of this oil is heated under high vacuum to 250–300° C. N-methyl aniline and 1.2-benzazulene are distilled into a preliminary deep-cooled receiver. After the distillation has been completed, the precipitate is taken up in ether, the greenish-blue solution in ether is shaken several times with N/10 hydrochloric acid and dried after it has been washed neutral. With the ether being distilled off, there are obtained crystals which are dark blue to violet in colour and have a melting point of 175° C. The trinitrobenzoate has a melting point of 154 to 155° C.

Example 5

93 g. (1 mol) of β-picoline (98%) are added together with 107 g. (1 mol) of N-methyl aniline, while cooling with ice, to a solution of 116 g. of cyanogen bromide in 300 cc. of ether (prepared according to F. Baum, Berichte der Deutschen Chemischen Gesellschaft 41 (1908) 523). After a violent reaction, an orange-red crystal magma is precipitated, which is immediately filtered with suction and recrystallized from ethanol. There are obtained 191 g. (=85% of the theoretical yield) of 1-N-methyl-anilido-methyl-pentadiene-1.3-al-5-cyanamide in orange-red needles with a melting point of 146 to 147° C.

22.5 g. (1/10 mol) of this cleavage product of β-picoline are dissolved in 100 cc. of methanol and shaken for about fifteen minutes at room temperature with 50 cc. of 20% aqueous caustic soda solution. The orange-red colour then changes to yellow. The solution is then diluted with water, neutralised with dilute acetic acid and the yellowish-brown oil separated out is taken up in ether. After drying the ethereal phase and drawing off the ether, there remains a brown crystal magma which, recrystallised from hexane, yields 1-N-methyl-anilido-methyl-pentadiene-1.3-al-(5) in the form of yellow crystals with a melting point of 93 to 95° C. and in a yield of 148 g. (=74% of the theoretical).

10 g. (1/20 mol) of this aldehyde are introduced with 3.3 g. (1/20 mol) of cyclopentadiene into a solution of 1.5 g. of sodium in 20 cc. of absolute ethanol. The solution immediately becomes dark red in colour and heats up slightly. After two hours, the reaction mixture is introduced into strongly diluted acetic acid and the 1-N - methyl-anilido - methyl-pentadienylidene-cyclopentadiene separating out as a red oil is taken up in ether. After drying the ethereal solution and distilling off the ether, the residue is heated under high vacuum to 150 to 180° C. The azulene formed distils over as a blue oil together with N-methyl aniline into a deep-cooled receiver. After completing the distillation, the precipitate is absorbed in ether and the N-methyl-aniline is removed with N/10 hydrochloric acid. The ethereal methyl azulene solution, which is pure blue in colour, is dried. After removing the ether, an oil which is deep blue in colour remains. The said oil has the properties and physical constants described in literature for 5-methyl-azulene.

Example 6

One part by weight of solid crystalline 5-(n-methyl-anilido)-pentadienylidene-cyclopentadiene are thoroughly mixed with 10 parts by weight of crystalline benzidine being as far as possible purified so as to remove any parts of benzidine salts. The mixture is pressed into the form of pastilles, preferably on a tablet machine.

An iron vessel having a capacity of about 10 liters is charged with 1 kg. of benzidine and heated to about 300° C. Water vapors superheated to about 300° C. are introduced into the vessel and are leaving the vessel by way of a wide descending condenser. The iron vessel is provided at its top with a long vertical tube carrying at its upper end a mechanism for introducing the pastilles into the vessel during the processing. 50 g. of the pastilles are charged each time into the vessel. The distillate going off is coloured blue at first. When after some minutes no more blue azulene but only colourless benzidine is distilling over the next charge of 50 g. of the pastilles is introduced into the vessel until the mixture is worked up.

The process is conducted in such a way that the volume of benzidine in the reaction vessel remains as far as possible constant. This may be achieved for instance by introducing continuously about the same quantity of benzidine as is carried off. At the end of the experiment the charge contained in the vessel is distilled over with the superheated steam as far as possible. The greatest part of the water is removed from the combined distillates by suction and the solid blue coloured mass of crystals is subjected to a distillation with saturated water vapors of 100° C. The azulene is distilling over. It contains only traces of benzidine and methylaniline. The azulene is extracted with a suitable solvent such as hexane or ether. The organic bases are washed out by shaking the extract with dilute hydrochloric acid. The extract is dried and the solvent is distilled off in a column. The residue forms pure crystallized azulene the yield amounting to 0.35–0.40 g. azulene per g. of fulvene charged as starting product i. e. 65–70% of the theoretical yield. The yield is independent from the size of the charge in question.

*Example 7*

A mixture of 1 g. of 5-(N-methyl-anilido)-pentadien-ylidine-cyclopentadiene and of 50 g. benzidine is subjected to a distillation with water vapors superheated to 300° C. The azulene formed thereby and part of the benzidine are distilling over with the water vapors. The distillate is extracted with hexane. The benzidine is removed from the extract by washing the extract with dilute hydrochloric acid. The solution of the azulene in hexane thus obtained is dried. The hexane is distilled off in a small column. There are obtained as residue 380 mg. crystallized azulene i. e. 70% of the theoretical yield.

*Example 8*

1 g. of 5-(N-methylanilido)-pentadienylidene-cyclopentadiene are thoroughly mixed with 20 g. of copper powder and are then superheated to 100° C. under a high vacuum. Azulene and methylanilin are distilled into a deep cooled receiver. After 3–4 hours the contents of the receiver are dissolved in hexane. The blue-green solution in hexane is washed to a neutral reaction and dried. The hexane is distilled off in a small column. 360 mg. (i. e. 66.7% of the theoretical yield) of crystallized azulene are obtained melting at 96–98° C.

*Example 9*

2.2 g. (1/100 mol) sec. undecyl-cyclopentadiene (prepared by partly hydrogenating with lithium aluminium hydride the fulvene obtained from methylnonylketon and cyclopentadiene) and 1.87 g. (1/100 mol) of 1-N-methyl-anilido-pentadien-1.3-al-5 are dissolved in 10 cc. abs. ethanol and poured into a solution of 0.3 g. sodium in 5 cc. abs. ethanol. The reaction mixture assumes a slightly elevated temperature and a deep dark red colour. After 2 hours the alcohol is distilled off in vacuo. The residue forming a deep red coloured viscous oil is mixed with 50 g. benzidine and subjected to a distillation with water vapors superheated to 300° C. The azulene formed by the reaction is distilling over with the water vapors. After the distillation the azulene is extracted from the distillate with hexane. The benzidine is removed from the hexane solution by washing with dilute hydrochloric acid. The deep blue coloured hexane solution is dried and the hexane is distilled off. 1.4 g. (50% of the theoretical yield) of a deep blue oil remain as residue representing according to the elementary analysis, the molecular weight and the absorption spectrum the 1-sec. undecyl-azulene.

*Example 10*

A solution of 2.32 g. (1/100 mol) of benzhydril-cyclopentadiene (obtained by hydrogenating partly with lith- ium aluminium hydride the fulvene obtainable from benzophenone and cyclopentadiene) and 1.87 g. of 1-N-methylanilido-pentadien-1.3-al-5 in 10 cc. of abs. ethanol are poured into a solution of 0.3 g. of sodium in 5 cc. of abs. ethanol. The reaction mixture is heated slightly for a short time, whereby it assumes a dark red colour. After about 3 hours the ethanol is sucked off. The residue is mixed with 50 g. of benzidine and subjected to a distillation with water vapors superheated to about 300° C. Azulene is going over with the water vapors and is extracted from the distillate with ether. Benzidine is removed from the extract by washing with dilute hydrochloric acid. The dep blue coloured solution is dried and the ether is distilled off. The residue forms blue crystals melting at 90–91° C. and having a molecular weight of 289 (calc. 294) and represents the 1-benzhydrilazulene. The yield amounts to 1.3 g.

*Example 11*

A solution of 1.79 g. (1/100 mol) of 2-diethylamino isopropyl-cyclopentadiene (obtainable by partly hydrogenating with lithium aluminium hydride the fulvene obtaned from diethylamino-aceton and cyclopentadiene) and of 1.87 g. (1/100 mol) of 1-N-methyl-anilido-pentadien-1.3-al-5 in 10 cc. of abs. ethanol is poured into a solution of 0.3 g. sodium in 5 cc. of abs. ethanol. The reaction solution assumes a deep red colour and is freed from ethanol under vacum after 1 hour. The remaining red oil is mixed with 50 g. of benzidine and subjected to a distillation with water vapors superheated to about 300° C. The azulene formed by the reaction is going over with the water vapors and is extracted from the distillate with hexane. The deep blue coloured solution in hexane is dried and the hexane is distilled off. 1.3 g. of 1-(2-diethylamino-isopropyl)-azulene remain as a deep blue coloured oil being easiy soluble in dilute hydrochloric acid.

What we claim is:

1. Process for preparing azulenes which comprises subjecting a member of the group consisting of the compounds of the general formula

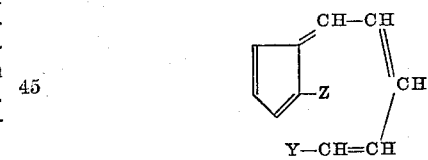

wherein Z stands for hydrogen, Y represents a member of the group consisting of the halogens, the hydroxy-group, the alkoxygroups and the substituted and unsubstituted aminogroups and the hydrogen atoms otherwise present in the molecule may be substituted by monovalent radicals, and of the tautomers of the said compounds to a temperature of about 100–300° C.

2. Process for preparing azulenes which comprises subjecting a member of the group consisting of the compounds of the general formula

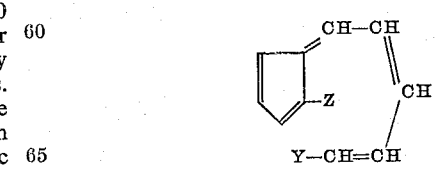

wherein Z stands for hydrogen, Y represents a member of the group consisting of the halogens, the hydroxy-group, the alkoxygroups and the substituted and unsubstituted aminogroups and the hydrogen atoms otherwise present in the molecule may be substituted by monovalent radicals, and of the tautomers of the said compounds to a temperature of about 100–300° C. in the presence of a high boiling inert solvent.

3. Process for preparing azulenes which comprises subjecting a member of the group consisting of the compounds of the general formula

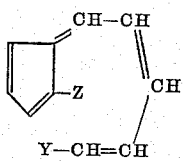

wherein Z stands for hydrogen, Y represents a member of the group consisting of the halogens, the hydroxygroup, the alkoxygroups and the substituted and unsubstituted aminogroups and the hydrogen atoms otherwise present in the molecule may be substituted by monovalent radicals, and of the tautomers of the said compounds to a temperature of about 100–300° C. in the presence of a high boiling inert solvent of basic character.

4. Process for preparing azulenes which comprises subjecting a member of the group consisting of the compounds of the general formula

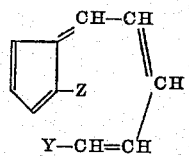

wherein Z stands for hydrogen, Y represents a member of the group consisting of the halogens, the hydroxygroup, the alkoxygroups and the substituted and unsubstituted aminogroups and the hydrogen atoms otherwise present in the molecule may be substituted by monovalent radicals, and of the tautomers of the said compounds to a temperature of about 100–300° C. and removing from the reaction zone the azulene formed by the reaction immediately after its formation.

5. Process for preparing azulenes which comprises subjecting a member of the group consisting of the compounds of the general formula

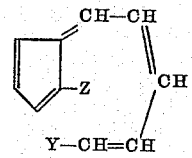

wherein Z stands for hydrogen, Y represents a member of the group consisting of the halogens, the hydroxygroup, the alkoxygroups and the substituted and unsubstituted aminogroups and the hydrogen atoms otherwise present in the molecule may be substituted by monovalent radicals, and of the tautomers of the said compounds to a temperature of about 100–300° C. in the presence of a high boiling inert solvent and removing from the reaction zone the azulene formed by the reaction immediately after its formation.

6. Process for preparing azulenes which comprises subjecting a member of the group consisting of the compounds of the general formula

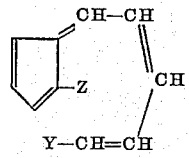

wherein Z stands for hydrogen, Y represents a member of the group consisting of the halogens, the hydroxygroup, the alkoxygroups and the substituted and unsubstituted aminogroups and the hydrogen atoms otherwise present in the molecule may be substituted by monovalent radicals, and of the tautomers of the said compounds to a temperature of about 100–300° C. in the presence of a high boiling inert solvent of basic character and removing from the reaction zone the azulene formed by the reaction immediately after its formation.

7. Process for preparing azulenes which comprises mixing a member of the group consisting of the compounds of the general formula

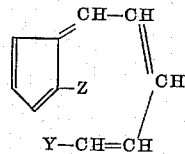

wherein Z stands for hydrogen, Y represents a member of the group consisting of the halogens, the hydroxygroup, the alkoxygroups and the substituted and unsubstituted aminogroups and the hydrogen atoms otherwise present in the molecule may be substituted by monovalent radicals, and of the tautomers thereof with a high boiling inert solvent of basic character and subjecting the said mixture to a distillation with water vapors superheated to about 100–300° C.

8. Process for preparing azulenes which comprises mixing a member of the group consisting of the compounds of the general formula

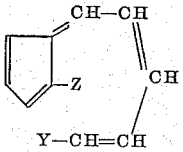

wherein Z stands for hydrogen, Y represents a member of the group consisting of the halogens, the hydroxygroup, the alkoxygroups and the substituted and unsubstituted aminogroups and the hydrogen atoms otherwise present in the molecule may be substituted by monovalent radicals, and of the tautomers of the said compounds to a temperature of about 100–300° C. in the presence of a high boiling inert solvent of basic character and subjecting the said mixture to a distillation under a high vacuum at a temperature of about 150–300° C.

9. Process for preparing azulenes which comprises condensing a cyclopentadiene, which is substituted in at least one ortho-position to the $CH_2$-group by hydrogen, with a compound of the general formula $$O=CH-CH=CH-CH=CH-Y$$

wherein Y represents a member of the group consisting of the halogens, the hydroxygroup, the alkoxygroups and the substituted and unsubstituted aminogroups and the hydrogen atoms being present in the molecule may be substituted by monovalent radicals, and subjecting the pentadienylidene-cyclopentadiene-derivative thus obtained to a temperature of about 100–300° C.

10. Process for preparing azulenes which comprises condensing a cyclopentadiene, which is substituted in at least one ortho-position to the $CH_2$-group by hydrogen, with a compound of the general formula $$O=CH-CH=CH-CH=CH-Y$$

wherein Y represents a member of the group consisting of the halogens, the hydroxygroup, the alkoxygroups and the substituted and unsubstituted aminogroups and the hydrogen atoms being present in the molecule may be substituted by monovalent radicals, and subjecting the pentadienylidene-cyclopentadiene-derivative thus obtained to a temperature of about 100–300° C. in the presence of a high boiling inert solvent of basic character.

References Cited in the file of this patent

UNITED STATES PATENTS 2,629,750    Rath _____ Feb. 24, 1953

OTHER REFERENCES

Gordon: Chemical Reviews, vol. 50, No. 1 (February 1952), pages 127–200.